Nov. 1, 1932.   G. W. LANE   1,886,030
METHOD OF AND APPARATUS FOR DRYING CLOTH
Filed Jan. 20, 1931
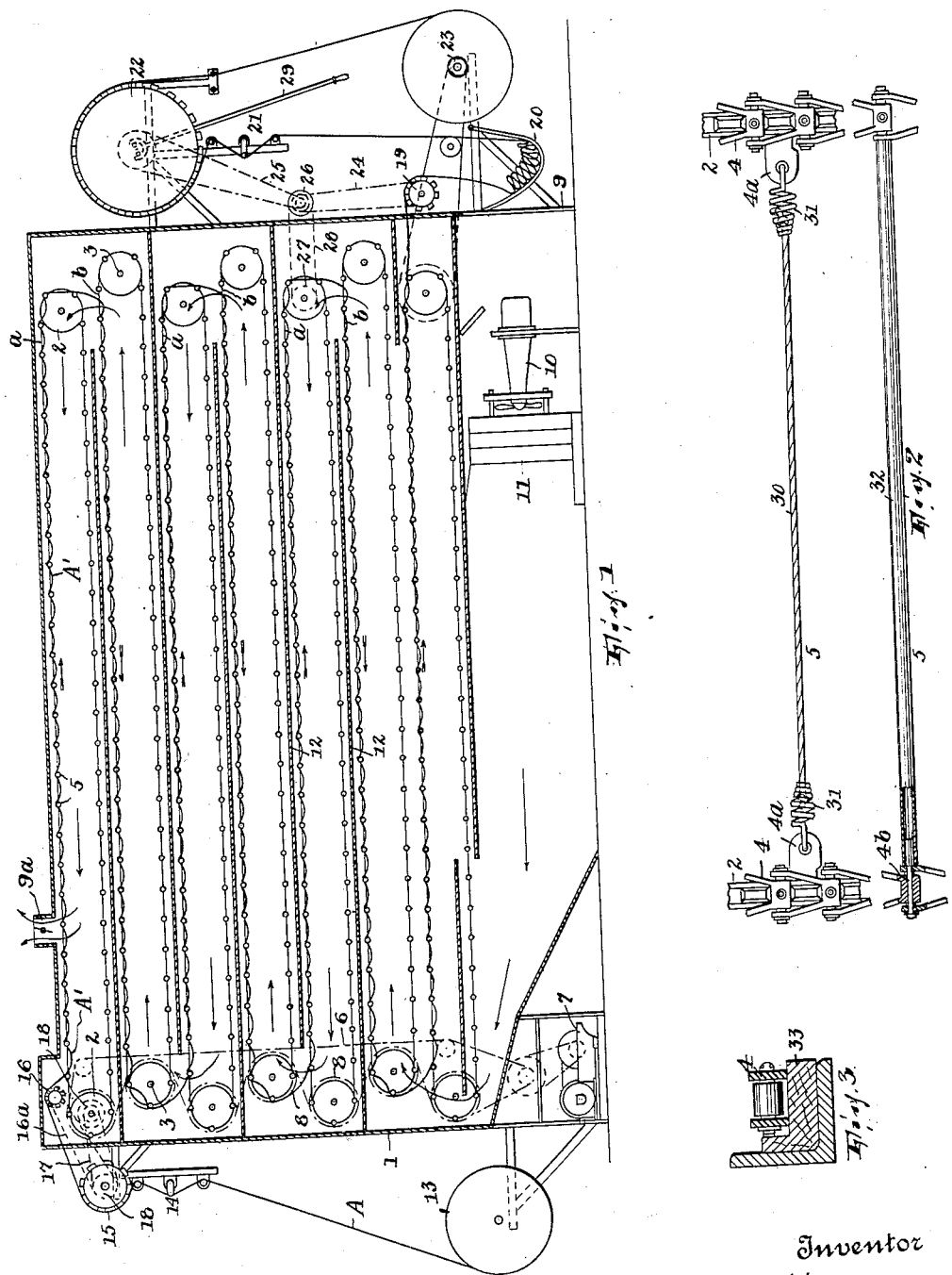
Inventor
George W. Lane,
By his Attorney Patented Nov. 1, 1932

1,886,030

UNITED STATES PATENT OFFICE

GEORGE W. LANE, OF CLIFTON, NEW JERSEY, ASSIGNOR TO VAN VLAANDEREN MACHINE COMPANY, OF PATERSON, NEW JERSEY, A CORPORATION OF NEW JERSEY

METHOD OF AND APPARATUS FOR DRYING CLOTH

Application filed January 20, 1931. Serial No. 509,932.

In order to make possible economy of space, heat and power and other advantages it has been proposed in the drying of fabrics to provide a series of superposed horizontally extending conveyors of which the alternates move reversely to the remainder and each conveyor reaches at its delivery end short of the one next below so that upon delivery of the fabric progressively or lengthwise of itself to the topmost or receiving conveyor it will be carried thereby in one direction, then fall onto the next conveyor and be carried thereby in the opposite direction, and so on—see, for instance, Patent No. 1,741,755.

The present invention has for its object to accomplish successfully with the use of such apparatus the drying of delicate or more or less flimsy fabrics, such as crepe. I have found, however, that in the drying of fabrics of this class it is not practicable to employ conveyors of the plain belt or apron non-reticulate type, or of the reticulate or net type, or of the longitudinal spaced parallel-strap type, since conveyors of the first type support the wet fabric in creased form wherever it happens to be deposited thereon in that form; conveyors of the second type possess the same fault and also impress or imprint the wet fabric with their own reticulate pattern (the creases on the one hand or imprints on the other becoming of course set in the fabric when it dries); and conveyors of the third type permit if they do not as an incident of their motion actually cause the moisture-laden and flimsy fabric to fall therefrom in the treatment and get out of control. Hence I employ in the apparatus indicated conveyors of the type having spaced supports extending transversely of the conveyors. However, the mere employment of such conveyors in the arrangement hereinbefore referred to is not of itself sufficient to accomplish my object, for I find that unless the fabric is also delivered to the conveyors so as not to hang in loops from the supports it will issue more or less seriously injured by the treatment; this is because, being so delicate in texture and weighted with water initially, the loops stretch the fabric locally, or in the vicinity of the supports, and when it dries it sets with its mesh more open where thus stretched than elsewhere. I find, on the other hand, that if the fabric is delivered at a rate relatively to the speed of the conveyors not exceeding that which will leave it upon such delivery hanging between each two adjoining supports of the conveyors in a curve or festoon all the radii of which are substantially equal (thus being distinct from festoons of the loop type characterized by appreciable curvature only at their lower ends), the fabric issues from the treatment dried or set without creases or imprints and without stretching due either to its shrinking and thereby causing such stretching as an incident of its reaching around the delivery ends of the conveyors or to the weight of the festoons.

In addition to the method thus involved my invention consists in a conveying apparatus comprising supporting means, a pair of flexible and substantially parallel spaced carrying members arranged and movable lengthwise of themselves in the supporting means, and elastic supports for the material to be conveyed linking said members together and arranged at intervals lengthwise thereof, said apparatus including means to hold said members apart with the supports in a state of tension.

Referring to the accompanying drawing,

Fig. 1 is a longitudinal sectional view, more or less diagrammatic, of the apparatus and illustrating my method of drying;

Fig. 2 shows in plan a fragment of one of the conveyors and sprocket wheels therefor; and Fig. 3 is a fragmentary transverse sectional view of a part of the apparatus.

In a chamber 1 closed at the sides, ends, top and bottom are arranged endless superposed conveyors $a$ and $b$ extending horizontally and each around sprocket wheels 2 on horizontal shaft 3 journaled in the sides of the chamber and near the ends thereof. The conveyors $a$ and $b$ have their respective right and left ends short of the adjoining ends of the conveyors respectively next below them, wherefore if the fabric A be delivered to the topmost or receiving conveyor and the conveyors $a$ and $b$ respectively have their conveying movement to right and left (short arrows, Fig. 1) the fabric will travel through the chamber in a downward sinuous course, falling at each stage onto the conveyor next below. Each conveyor includes a pair of chains 4 (which directly engage the sprocket wheels, Fig. 2) and transverse fabric supports 5 spaced at regular intervals from each other. The conveyors are all driven at the same speed by a chain 6 from a sprocket on a motor 7, the chain engaging sprockets 8 on shafts 3. Air for drying, admitted at opening 9 and escaping at 9a, may be delivered by a blower 10 through a heater 11 and may pass up through a sinuous passage formed by a series of horizontal walls 12 alternating with the conveyors and of which those next below the respective conveyors $a$ reach from the left end of the chamber but short of such conveyors and those next below the conveyors $b$ vice versa, whereby the air at each stage travels—(see the long arrows) contrary to the conveying movement of the corresponding conveyor.

The fabric is taken from a revoluble roll 13 thereof and after passing a means 14 for spreading it transversely (unnecessary to describe) it extends around means for delivering it to the chamber and onto the topmost conveyor, such means here consisting of a pair of reels 15 and 16 connected by a belt-and-pulley means 16a to rotate at the same peripheral speed. The means 15—16 is driven from the near shaft 3 through a drive here consisting of a belt 17 and cone-pulleys 18 on the shaft 3 and reel 15, whereby the speed of said means relatively to that of the conveyor may be altered according to circumstances, any suitable belt-shifter (not shown) being provided. The fabric is drawn from the chamber by a reel 19 and falls into a crib 20 from whence, after passing another such spreading means 21 as that, 14, already mentioned, it extends around a take-up reel 22 and to a beam 23 on which it is wound. The reels 19 and 22 are driven by belts 24 and 25 from a pulley 26, in turn driven from a pulley 27 on one of the shafts 3 by a belt 28, the pulleys 26 and 27 being reverse cone pulleys. 29 simply designates a clutch means whereby if the delivery fails to provide accumulation of fabric in the crib the driving of reel 22 may be stopped by the attendant.

The fabric A is delivered progressively onto the series of conveyors as shown by Fig. 1 and each time it reaches the far end of a conveyor it falls onto the one next below, in each case being carried by the conveyor in the form of festoons A'. The rate of delivery, relatively to the speed of the conveyors, is maintained so that these festoons take the form of curves all the radii of each of which are equal. Being in the form of festoons there is ample allowance for shrinkage which would otherwise cause stretching incident to the fabric extending around the discharge ends of the conveyors, and since these festoons are curves each having substantially equal radii (as distinct from festoons of the loop type characterized by curves appreciable only at their lower ends) their weight, even when heavily laden with moisture, does not cause the mentioned localized stretching. The rate of delivery is of course here a matter of shifting belt 17 on the cone pulleys, and it may be varied (within the limit indicated) to suit any particular fabric of the class indicated. However, my invention being a method of drying fabrics it is apparent that it is not material whether the delivery be accomplished by mechanical means or manually.

Referring, now, to the specific construction of the conveyors: Given supporting means (here afforded by parts 1, 2 and 3) in which flexible and substantially parallel spaced members (as 4) are arranged and movable lengthwise of themselves therein, I utilize for some of the fabric supports 5 elastic elements which link said members together and for others spreaders which form means to hold said members apart with the elastic elements or supports in a state of tension, those of the supports which are spreaders being spaced at relatively wide intervals, so that they are comparatively few in number. Each elastic element consists, preferably, of a fibrous cord or rope 30 having a helical spring 31 fitted over each end and such ends knotted to prevent their withdrawal from the springs, which are hooked to eyes 4a of the chains. Each spreader consists of a length of metal tubing 32 receiving in its ends the extended ends of pintles 4b of the chains 4 by which their links are interconnected. Thus I provide a conveying apparatus whose conveyor fabric supports do not represent undue weight, are not subject to warping as in the case of wood, and are all straight so that the fabric is uniformly supported. Moreover, since most of the supports are formed of rope or cord, and since the few remaining ones (spreaders) may be readily coated with fabric, the possibility of staining the fabric by contact while wet with the supports is avoided.

The upper or fabric supporting stretch of each chain between the sprocket wheels slides on a rail 33 (Fig. 2) which confines it to a horizontal path and keeps it from vibrating and hence shaking the fabric.

Having thus fully described my invention what I claim is:

1. The hereindescribed method of drying a fabric which consists in delivering the same progressively onto the upper one of a series of superposed conveyors, of which each travels in the reverse direction to and discharges onto the one next below and which have uniformly spaced fabric supports extending transversely of their travel, and while maintaining the rate of such delivery relatively to the speed of the upper conveyor not exceeding that which will leave the fabric when so delivered hanging between said supports of such conveyor in a curve all the radii of which are substantially equal from one to the other of said supports.

2. A conveying apparatus comprising, in combination, supporting means, a pair of flexible and substantially parallel spaced carrying members arranged and movable lengthwise of themselves in the supporting means, and elastic supports for the material to be conveyed linking said members together and arranged at intervals lengthwise thereof, said apparatus including means to hold said members apart with said supports in a state of tension.

3. A conveying apparatus comprising, in combination, supporting means, a pair of flexible and substantially parallel spaced carrying members arranged and movable lengthwise of themselves in the supporting means, elastic supports for the material to be conveyed linking said members together and arranged at intervals lengthwise thereof, and spreaders also arranged at intervals lengthwise of the said members and holding the same apart with said supports in a state of tension.

In testimony whereof I affix my signature.
GEORGE W. LANE.